United States Patent
Blase

(10) Patent No.: US 6,695,014 B2
(45) Date of Patent: Feb. 24, 2004

(54) ENERGY GUIDING CHAIN

(75) Inventor: Frank Blase, Bergisch Gladbach (DE)

(73) Assignee: Igus SpritzguBteile fur die Industrie GmbH, Cologne (DE)

(*) Notice: Subject to any disclaimer, the term of this patent is extended or adjusted under 35 U.S.C. 154(b) by 0 days.

(21) Appl. No.: 10/204,149

(22) PCT Filed: Feb. 13, 2001

(86) PCT No.: PCT/EP01/01576
§ 371 (c)(1),
(2), (4) Date: Dec. 2, 2002

(87) PCT Pub. No.: WO01/61816
PCT Pub. Date: Aug. 23, 2001

(65) Prior Publication Data
US 2003/0136456 A1 Jul. 24, 2003

(30) Foreign Application Priority Data
Feb. 16, 2000 (DE) ..................... 200 02 820 U

(51) Int. Cl.[7] ............. F16G 13/00; F16G 27/04
(52) U.S. Cl. ............. 138/120; 138/155; 59/78.1; 248/51
(58) Field of Search ............... 138/120, 155, 138/110, 118; 285/223, 264, 166; 59/78.1, 900; 248/49, 51

(56) References Cited

U.S. PATENT DOCUMENTS

| | | | | |
|---|---|---|---|---|
| 3,330,105 A | * | 7/1967 | Weber | 59/78.1 |
| 4,228,825 A | * | 10/1980 | Moritz et al. | 138/120 |
| 4,384,594 A | * | 5/1983 | Moritz | 138/120 |
| 4,392,344 A | * | 7/1983 | Gordon et al. | 59/78.1 |
| 5,048,293 A | * | 9/1991 | Aoyagi | 60/420 |
| 5,201,885 A | * | 4/1993 | Wehler et al. | 59/78.1 |
| 5,248,170 A | * | 9/1993 | Francis | 285/114 |
| 5,322,480 A | | 6/1994 | Meier et al. | 474/145 |
| 5,445,569 A | | 8/1995 | Blase | 474/145 |
| 5,469,201 A | * | 11/1995 | Erickson et al. | 347/85 |
| 5,740,839 A | * | 4/1998 | Kuo et al. | 138/120 |
| 5,839,476 A | * | 11/1998 | Blase | 138/120 |
| 5,890,357 A | | 4/1999 | Blase | 59/78.1 |
| 5,980,409 A | | 11/1999 | Blase | 474/218 |
| 5,987,873 A | * | 11/1999 | Blase | 59/78.1 |
| 5,996,330 A | * | 12/1999 | Ehmann et al. | 59/78.1 |
| 6,016,844 A | * | 1/2000 | Takahashi et al. | 138/120 |
| 6,167,689 B1 | | 1/2001 | Heidrich et al. | 59/78.1 |
| 6,318,063 B1 | * | 11/2001 | Komiya et al. | 59/78.1 |
| 6,408,888 B1 | * | 6/2002 | Baumer et al. | 138/120 |
| 6,408,889 B1 | * | 6/2002 | Komachi | 138/120 |

FOREIGN PATENT DOCUMENTS

| | | | | |
|---|---|---|---|---|
| DE | 198 39 575 | | 3/2000 | F16G/13/16 |
| GB | 1 580 892 | | 12/1980 | F16G/13/16 |

* cited by examiner

Primary Examiner—Patrick Brinson
(74) Attorney, Agent, or Firm—Grossman, Tucker, Perreault & Pfleger, PLLC

(57) ABSTRACT

The invention concerns an energy guide chain for guiding hoses, cables or lines comprising chain links (2) each consisting of two link plates (3) and at least one crossbar (8) connecting the link plates, wherein link plates (3) of adjacent chain links (2) have pivot regions comprising mutually corresponding pivot pins (4) and openings (5) for receiving the pivot pins, by means of which the chain links (2) are pivotably interconnected, and wherein the link plates (3) of adjacent chain links (2) have mutually overlapping overlap regions (21, 22), forming lines (6, 7) of link plates, and wherein at least one link plate (3) is provided with a region (15, 20) of weakened material, which permits a variation in length of the link plate line (7) beyond the play which occurs in the pivot region (4, 5) in all directions of the link plate (3). In order to permit improved straight-ahead movement of the chain the material-weakened region (15, 20) is in the form of an elastically deformable region of the link plate (3). The elastic region can be in the form of a cross-sectional constriction of the link plate (3), which extends over the entire height thereof.

16 Claims, 7 Drawing Sheets

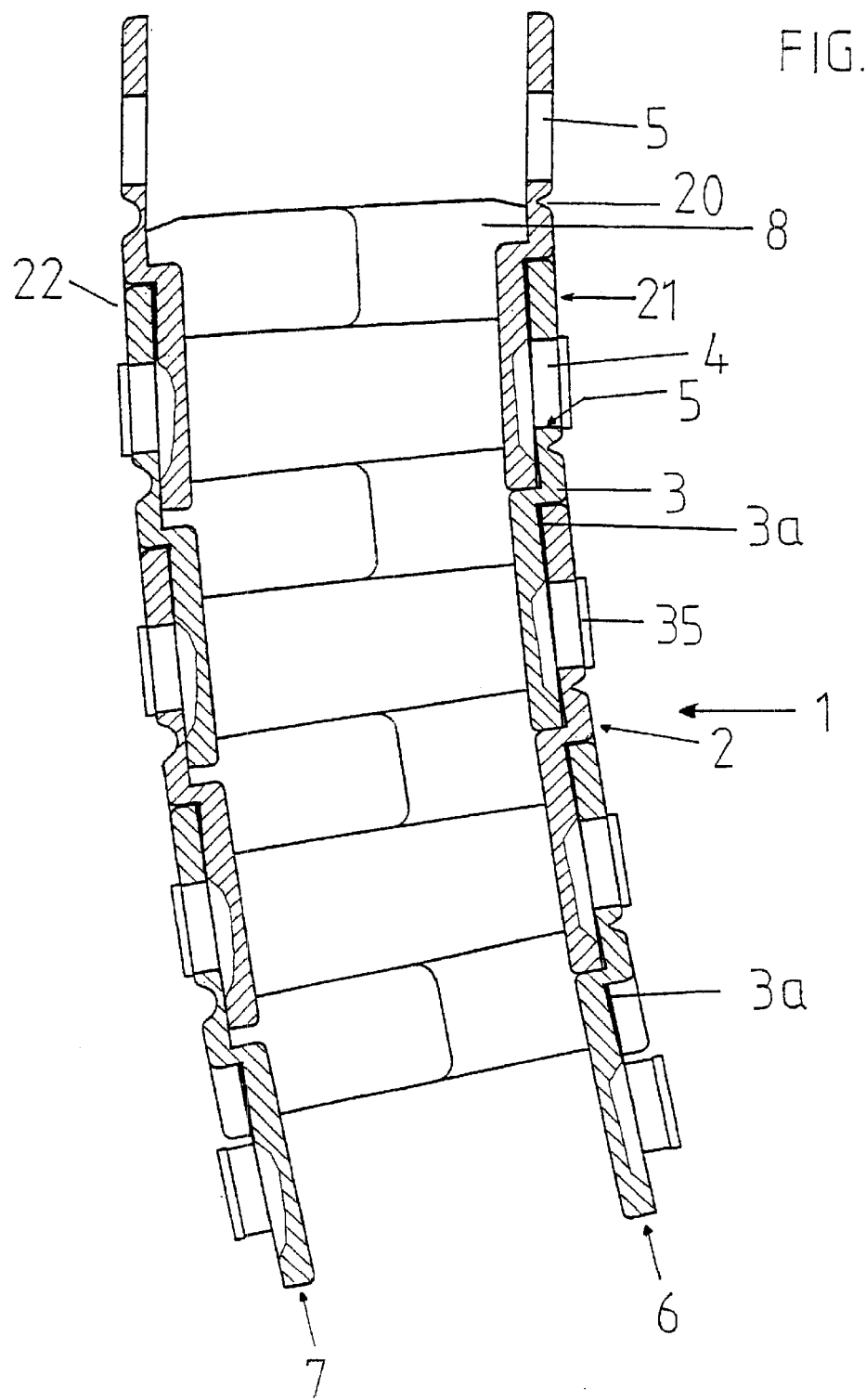

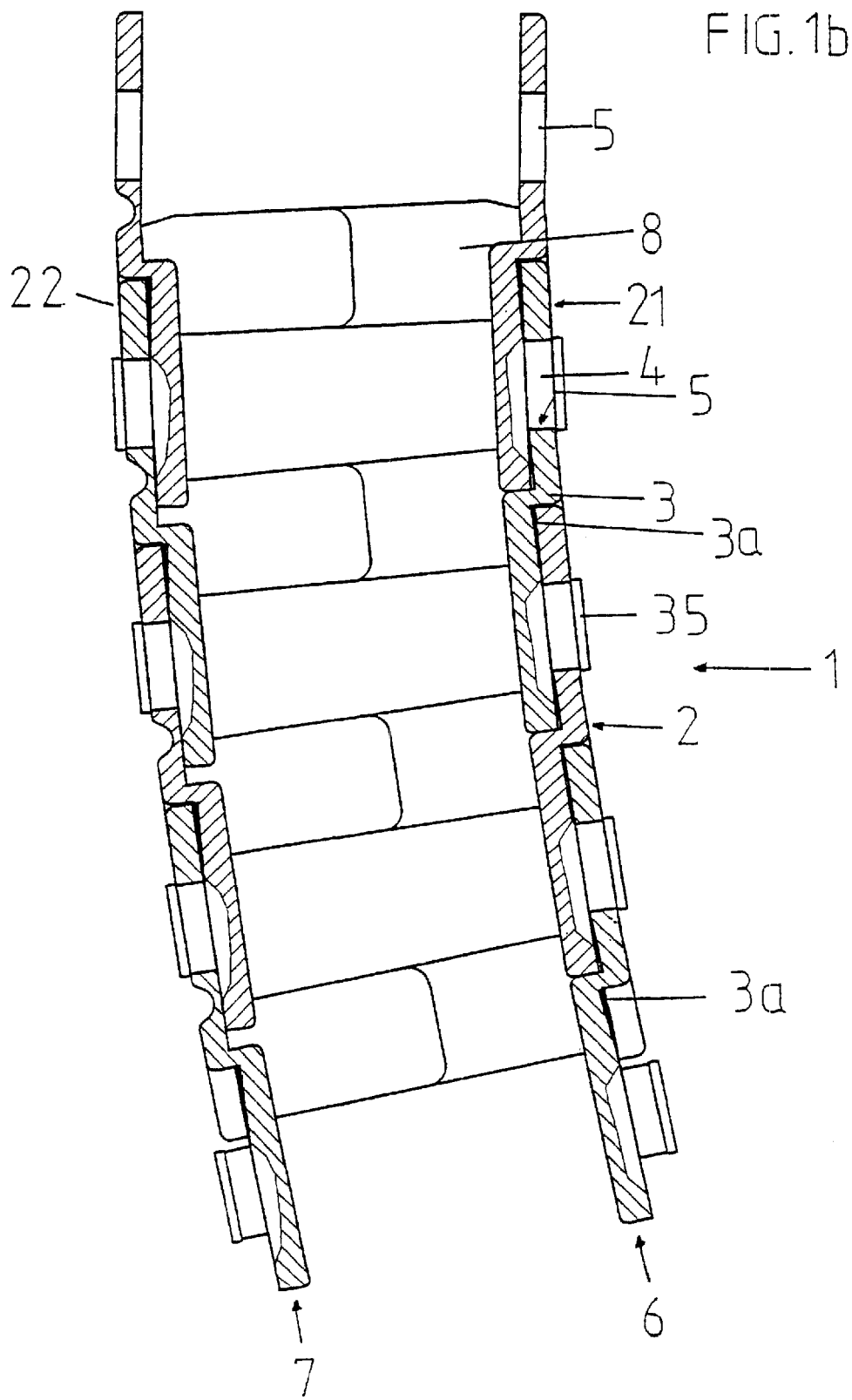

Figure 3:
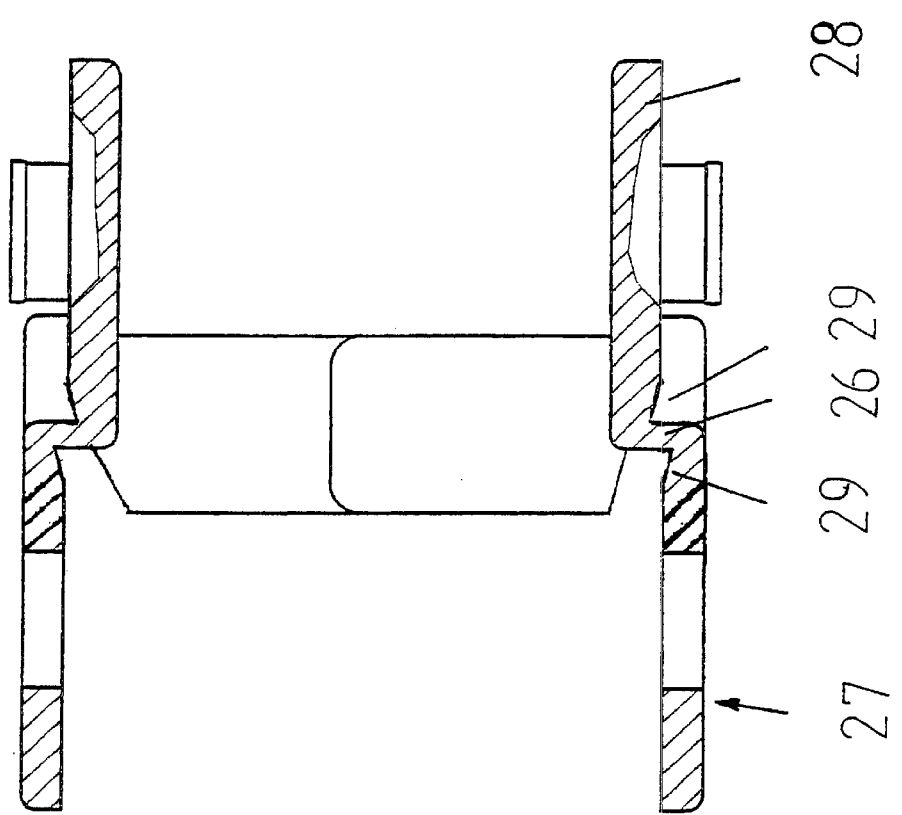

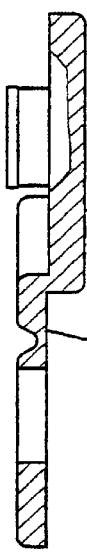
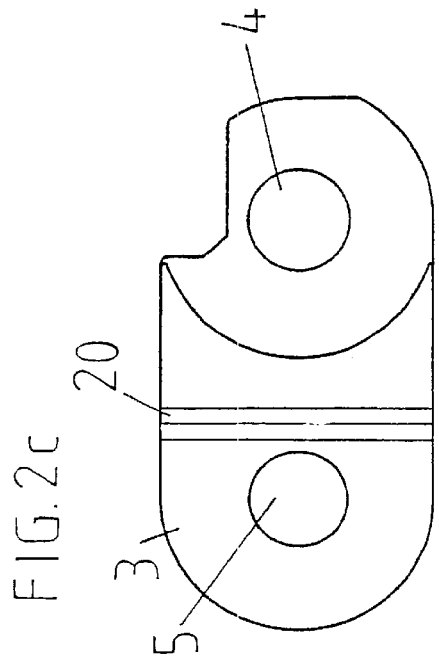
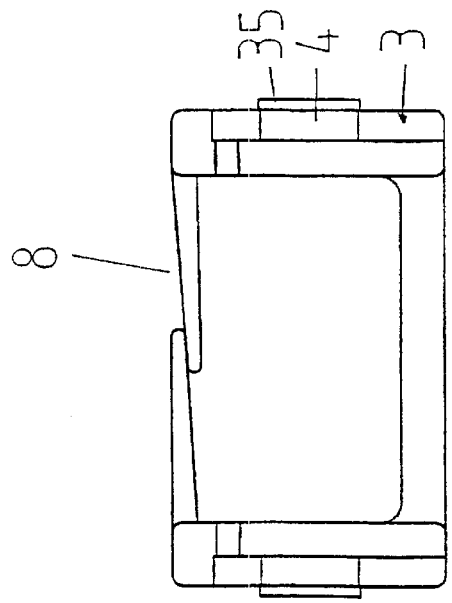

ENERGY GUIDING CHAIN

The invention concerns an energy guide chain for guiding hoses, cables or lines, comprising chain links each consisting of two link plates and at least one crossbar connecting the link plates, wherein link plates of adjacent chain links have pivot regions comprising mutually corresponding pivot pins and openings for receiving the pivot pins, by means of which the chain links are pivotably interconnected, and wherein the link plates of adjacent chain links have mutually overlapping overlap regions, forming lines of link plates, wherein the mutually corresponding pivot pins and openings are arranged in the overlap regions of the link plates and wherein at least one link plate is provided with a region of weakened material which permits a variation in length of the chain line beyond the play which occurs in the pivot region in all directions of the link plate.

Energy guide chains are mostly used when the movable connecting point with which at least one consumer is associated is moved linearly along the longitudinal direction of the energy guide chain. Certain tolerances in the straight-line movement of the connecting point can be accommodated by the play in the pivot connections of the chain links.

In comparison, energy guide chains of the general kind set forth are used in areas of application in which the movable connecting point performs a significant motion transversely with respect to the longitudinal direction of the energy guide chain, more specifically simultaneously with or subsequently to a linear movement in the longitudinal direction of the chain. That transverse movement can be in the range of the width of a chain link or can be a multiple thereof.

GB 1 580 892 and DE 198 39 575 A1 disclose energy guide chains of the general kind set forth, in which the openings in the chain link plates for accommodating the chain link plates are oval or in the form of a slot so that the pivot regions have an increased play, in the longitudinal direction of the chain, in comparison with a direction which is perpendicular to the longitudinal direction of the chain in the main plane of the link plates. That additional play permits an increase in the length of the line of chain link plates.

Additional play in the pivot regions however involves the disadvantage that this worsens the properties of the energy guide chain, in terms of the straight-ahead movement thereof. Thus for example energy guide chains in which the top run is laid on the bottom run involve an increased danger of the top run slipping off the bottom run. Corresponding problems arise also in the case of a self-supporting top run or in other modes of operation with the energy guide chain. In addition the increased play in the pivot region means that the pivot connection between the link plates is subjected to a higher rate of wear.

Therefore the object of the present invention is to develop energy guide chains of the general kind set forth, in which the movable connecting point can perform a transverse movement with respect to the longitudinal direction of the energy guide chain, to such an effect that the energy guide chains enjoy improved properties in terms of straight-ahead movement, while being of a structurally simple design configuration and affording a long service life.

That object is attained by an energy guide chain in which the region of weakened material is in the form of an elastically deformable region of the link plate. Elastic deformation of the regions which in accordance with the invention are introduced into the link plates permits a variation in the length of the line of the chain, beyond the free play which occurs in the pivot region, but an elastic return force is opposed to the variation in length, the elastic return force improving the properties in terms of straight-ahead movement of the chain. It will be appreciated that the elastically deformable regions can also be provided in relation to openings for accommodating the pivot pins, which are of an oval cross-section, an elongate cross-section or a cross-section which is enlarged in another fashion.

The variation in length of the line of the chain can be effected by the link plates themselves experiencing a variation in length or by the connecting region of adjacent link plates being extensible. Therefore, the additional introduction of the elastically deformable region means that there can be a variation in position of a region of the energy guide chain transversely with respect to the longitudinal direction of the chain, which is markedly greater than is permitted in itself by the free play occurring in the pivot region of the chain links, without the pivot regions being excessively loaded in continuous operation of the chain. When the energy guide chain is of a given length, the movable connecting point can thus perform a markedly greater transverse movement which, over a length of a few chain links, for example four to ten chain links, without being restricted thereto, already permits lateral displacement of the movable connecting point by the width of a chain link.

The introduction of the elastically deformable regions means that the length of the line of link plates of the energy guide chain, which is associated with those regions, can be varied when a force acts thereon, that is to say it can be stretched or upset, thereby permitting bending of the energy guide chain transversely with respect to the longitudinal direction thereof. It will be appreciated that in that way the chain link plates of the oppositely disposed line thereof are also subjected to the action of deformation forces which are to be absorbed in the pivot regions or by deformation of the link plates themselves. The elastically deformable regions of the chain can be arranged on the inwardly and/or outwardly curved side of the chain, in the event of a transverse movement thereof, so that one of the lines of link plates is upset or stretched or both lines vary their length in mutually opposite relationship, with respect to the neutral fiber of the chain.

The design configuration in accordance with the invention of the energy guide chain can be advantageous irrespective of the nature of its mounting, that is to say in a lying position but also when it is mounted in a lateral position or when the energy guide chain is disposed in a hanging or standing arrangement, that is to say when the direction-changing region which connects the mutually oppositely disposed runs forms the highest or the lowest region of the energy guide chain, or in the case of an energy guide chain which can be laid down in a zig-zag configuration. The pivot angle for example of link plates which are adjacent in a straight or angled position can be limited by abutments which are preferably arranged on the link plates and which can be formed in one piece thereon. The measures according to the invention can be implemented in relation to energy guide chains which are to be displaced linearly or along a circular arc, wherein in the latter case the chain links can be of an angled configuration, wherein the variation in length of a line portion of the chain, which goes beyond the play in the pivot regions, permits movement with a reduced or increased radius of curvature.

In accordance with a preferred embodiment there are provided link plates which between the pivot connections of the mutually oppositely disposed overlap regions of the chain link plate have elastically deformable regions extending over the entire height of the link plate, preferably perpendicularly to the longitudinal direction of the link plate. The elastically deformable region is preferably in the form of a cross-sectional constriction so that this region acts in the manner of a film hinge. The weakening of material can be afforded also by using a material of increased elasticity or by another element which permits a variation in length and preferably at the same time a variation in angle, which preferably exerts resilient return forces on the parts of the chain link plate which have experienced a change in position. Preferably the elastically deformable region is uniform over the entire height of the link plate. Such a weakening of material permits the pivot regions, as was hitherto usual, to have an only slight play, which affords the chain advantageous running properties, and at the same time also permits the adjoining parts of the plate to assume an angled configuration and possibly also to involve upsetting thereof. In addition the greater extent of the stretch region means that material fatigue phenomena are reduced.

The film hinge can be for example in the form of a groove of V-shaped or substantially round cross-section, with a spread angle of about 45–90°. The constriction can be to ⅕–½ of the mean thickness of the link plate, without being restricted thereto.

The elastically deformable region disposed between the pivot connections of the link plate can be arranged in particular adjacent to the means for accommodating the pivot pin of the adjacent chain link, that is to say adjacent to the location at which the forces resulting in the variation in length of the line of the chain act on the link plate which is reversibly variable in length under the effect of a force thereon.

In accordance with an advantageous development the cross-sectional constriction can have mutually spaced regions which, with respect to the main plane of the associated link plate, have a lateral displacement relative to each other and which permit an increase in the length of the link plate, with a reduction in the lateral displacement. The regions can be in the form of an outwardly displaced portion in the nature of an arcuate film bridge or stretch fold, in which case the two ends of the arc are arranged at and for example formed on oppositely disposed regions of the associated link plate, those regions being separated by the cross-sectional constriction. The arc can be open inwardly or outwardly with respect to the interior of the energy guide chain and can be displaced inwardly or outwardly in the central region with respect to the fixing regions of the arc to the associated link plate portions, so that the central portion of the arc projects inwardly or outwardly beyond the fixing regions. The arc can thus be for example of a U-shaped, V-shaped or W-shaped configuration, which can apply for the side surfaces of the arc, which are both towards and away from the interior of the chain. In this arrangement the side surfaces of the elastically deformable region can extend substantially parallel to each other. In addition the arc can be of a cross-section which is substantially constant over the length of the arc. When the chain link plate is increased in length or upset, the arc is flattened or the flanks of the arc become steeper, wherein lateral displacement of the central portion of the arc in relation to the fixing regions of the arc takes place at the respective link plate portions. The arc-like film hinge therefore permits at the same time a variation in length and angle of the adjacent link plate regions relative to each other. Alternatively, lateral displacement of regions of the cross-sectional constriction can be achieved by the provision of a film hinge-like region which, with oppositely disposed ends, is mounted to and for example formed on the adjacent regions, which are variable in position relative to each other, of the respective link plate, at differing lateral spacings relative to the inside surface of the link plate. The film hinge is thus disposed inclinedly relative to the longitudinal direction of the link plate. A variation in length of the link plate can thus cause a slight lateral displacement relative to each other of the regions of a chain link plate, which are separated by the cross-sectional constriction.

The film hinge-like region of the link plate is preferably arranged completely within the cross-section of the substantially non-elastic adjoining regions of the link plate.

In accordance with a further advantageous embodiment, there are provided link plates or at least one plate which at the regions adjoining the openings for receiving the pivot pins, comprise an elastically deformable material, wherein elastic deformability can be based for example on a reduced thickness of material or the elastic properties of the material used. The regions of weakened material can be arranged on the side of the openings, which is towards the ends of the link plates. The elastically deformable regions can thus permit a variation in length of the corresponding line of link plates of the chain, upon a movement of the energy guide chain in the transverse direction, with compression thereof. In that way the pivot pin can move out of its reference position in the usual regular travel movement of the chain which is defined in particular by the link plate geometry (for example straight link plates in the case of chains for straight-ahead motion) and can thus permit lateral bending of the chain by a large degree, with a variation in the length of the line of chain link plates.

In accordance with a further advantageous embodiment the regions of weakened material can be in the form of pivot pins comprising an elastically deformable material which permits a variation in length of a line of chain link plates, with deformation of the pivot pins. Deformation of the pivot pins can be effected by elongation thereof and/or by upsetting of the diameter thereof. For that purpose there can be provided for example a region of the pivot pin involving a material which has a higher modulus of elasticity or a higher degree of compressibility than the adjoining material of the link plate or the oppositely disposed pivot pins of the chain link. The pivot pins can also be of smaller thickness than the pivot pins of the oppositely disposed link plate of the chain link, in which case the respective receiving means for the pivot pins can be identical, and the pivot pins can also have incisions to permit relative movement of adjacent link plates in the longitudinal direction of the chain. The pivot pins can be formed in one piece on the link plates or they can be formed separately.

Advantageously the pivot pins are guided with only slight play in the receiving means transversely with respect to the longitudinal direction of the link plates in order to prevent torsional movements of adjacent chain links relative to each other.

If the arrangement has cranked chain links having a region which is set back towards the interior of the chain and a region which projects towards the exterior of the chain, wherein the set-back and projecting regions of adjacent chain links can overlap each other, in accordance with a further embodiment the connecting region of the projecting and set-back portions of the chain link can be in the form of an elastically deformable region which extends over the entire height of the link plate and which is of increased elastic deformability in comparison with adjoining regions. The connecting region of the cranked chain links is of a substantially Z-shaped configuration so that, with a weakening of the material of that region, there can be a variation in the length of the link plate, with a change in the angle of the individual limbs of the connecting region. In that case the link plates are preferably designed in such a way that between the regions extending substantially in the longitudinal direction of the chain, there is a connecting region which extends perpendicularly thereto.

The ends of the link plates can have in the overlap region on the side towards the overlap region of the adjacent link member bevels or openings which permit deflection of the chain links in the transverse direction with respect to the energy guide chain. In particular the overlap regions provided with pivot pins can converge conically towards the ends. That configuration is particularly advantageous when the link plates do not have any elastically deformable region which extends over the entire height thereof and which results in easier angular positioning of the two overlap regions of a chain link relative to each other. In a corresponding manner the outwardly disposed overlap region of the chain link can be provided at its inside with a recess which is of the greatest depth in the middle region of the link plate.

The configuration of the link plates according to the invention can be provided both in relation to cranked link plates and also in relation to lines comprising alternate inner and outer link plates. The energy guide chain can comprise two or more trains or lines of link plates, wherein one line is made up exclusively of link plates in which there are no elastically deformable regions permitting an excessive variation in length of the line of link plates, wherein all or some of the link plates of the oppositely disposed line thereof have corresponding elastically deformable regions. The proportion of the link plates with elastically deformable regions, which make up a line thereof, makes it possible to adjust deflection of the energy guide chain in the transverse direction, which occurs when a given force is acting on the chain. Thus for example chain links with elastic regions can alternate with conventional link plates or can be respectively arranged in alternately disposed groups each having the same or different numbers of link plates of the same type. Particularly when the arrangement has link plates with elastic regions which permit a variation in length of the line of link plates, wherein the elastic regions are embodied by a reduced material thickness or a higher degree of elasticity of the corresponding material, it is possible to provide chain links in which both oppositely disposed link plates are provided with a corresponding elastic region. In particular both link plates of a chain link can be provided with material-weakened regions extending over the total height of the link plate, for example in the form of film hinge-like cross-sectional constrictions or connecting regions of suitable configuration in respect of overlap regions of the link plates, which are cranked forward and back, but also with pivot regions of suitable configuration. In order to achieve a significant variation in length of the line of the chain with link plates of that kind, corresponding forces which exceed a limit value have to be applied to the line of the chain, wherein return forces are produced by elastic deformation of the regions which permit the variation in length of the line of the chain. Chains of that kind thus have good travel properties in straight-ahead movement, when, in one or more chain links, both link plates are provided with regions involving a weakening of material.

The link plates of a chain link can be connected by substantially rigid crossbars which are preferably formed in one piece thereon or which can also be secured in position by retaining means. The crossbars can also be adapted to be twistable or can be of a divided design configuration.

It is possible to provide chain links having divided crossbars which have corresponding projections and openings which engage one into the other, wherein the projection on a crossbar region is pivotable through an angular range relative to the other crossbar region in the main plane of the crossbar, which is parallel to the longitudinal direction of the chain and perpendicular to the link plates. At the same time the opening is provided with an undercut configuration which engages behind the projection so that the separate crossbar regions are secured to prevent longitudinal displacement relative to each other in the longitudinal direction of the crossbar, at least after a certain play or practically without play.

The material-weakened regions are preferably arranged at the parts of the link plates, which are provided with openings for receiving pivot pins.

It will be appreciated that the various embodiments of the elastic regions can also be embodied in different combinations in one and the same chain link or in one and the same link plate.

In order to permit stable movement or stable guidance of the chain in spite of the elastic regions, adjacent chain link plates of a line of link plates are advantageously connected together by means of a snap connection, thereby ensuring a secure and simple connection between the link plates, in particular when the chain involves transverse displacement. Advantageously, for that purpose the pivot pin is provided with retaining means and is designed for example in the manner of a press stud or is provided with securing springs, wherein the retaining means are advantageously disposed at the free ends of the pins so that they are prevented from being pulled out of the corresponding openings. Preferably the corresponding opening is provided over the entire extent thereof in the longitudinal direction of the link plate, with a groove or undercut configuration for receiving the retaining means.

However, other snap connections between link plates are also possible, for example if the front ends of the link plates are received at the adjacent chain link by a groove, so that the pivot pin of the respective link plate snaps into the corresponding opening, as is described for example in DE 195 12 088.

With the exception of the elastic regions according to the invention which permit an increase in the length of the line of link plates, the link plates of the energy guide chain according to the invention can be substantially rigid and flexurally stiff or can have a certain degree of lateral deformability. The longitudinal elastic deformability of the lines of link plates is made possible predominantly or practically exclusively by the elastic regions according to the invention.

It will be appreciated that the lines of link plates of the energy guide chain according to the invention can comprise cranked link plates or alternately arranged inner and outer link plates, without being limited thereto.

The invention further concerns a guide structure for the energy guide chain according to the invention, which can be in the form of a guide channel with oppositely disposed side walls and a bottom support. The guide structure can include fixing means for fixing to a carrier structure. The guide structure has straight guide profiles which are oriented in mutually parallel relationship, arranged laterally of the energy guide chain, over a part of the length of the guide structure, for receiving a region of the energy guide chain which is arranged in a straight configuration, wherein the guide profiles are arranged at the small spacing of the energy guide chain. The assembly also has at least one guide profile (possibly a plurality thereof) which includes an angle relative to the longitudinal direction of the guide profiles which are arranged straight, so that the straight guide region of the guide structure is adjoined by a guide region which is of an angled or arcuate configuration.

The guide profiles which adjoin the straight guide profiles at an angle in the longitudinal direction can have a different angle to the straight guide profiles, on opposite sides of the guide structure. That permits a transverse movement of the energy guide chain over an angular region and is restricted thereto, wherein there is a continuous transition in the guide structure to a guide region which only permits a longitudinal movement of the energy guide chain and which limits the transverse displacement to a slight amount, for example in the region of the width of a line of link plates of the energy guide chain. The regions of the guide structure, which are set in an angled position, can be angled towards one or both sides of the guide structure. The angled region of the guide structure can have a bottom support for the energy guide chain, but there can also be only a lateral guidance effect afforded by the guide structure.

Figure 4:
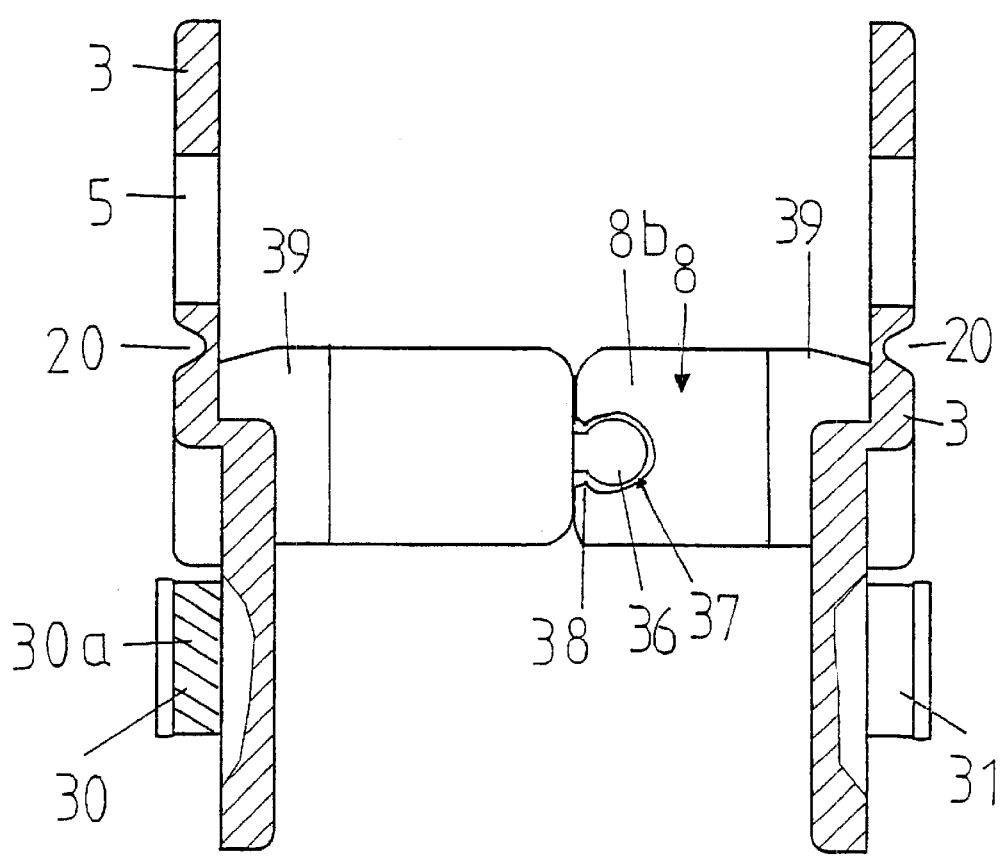
Figure 5:
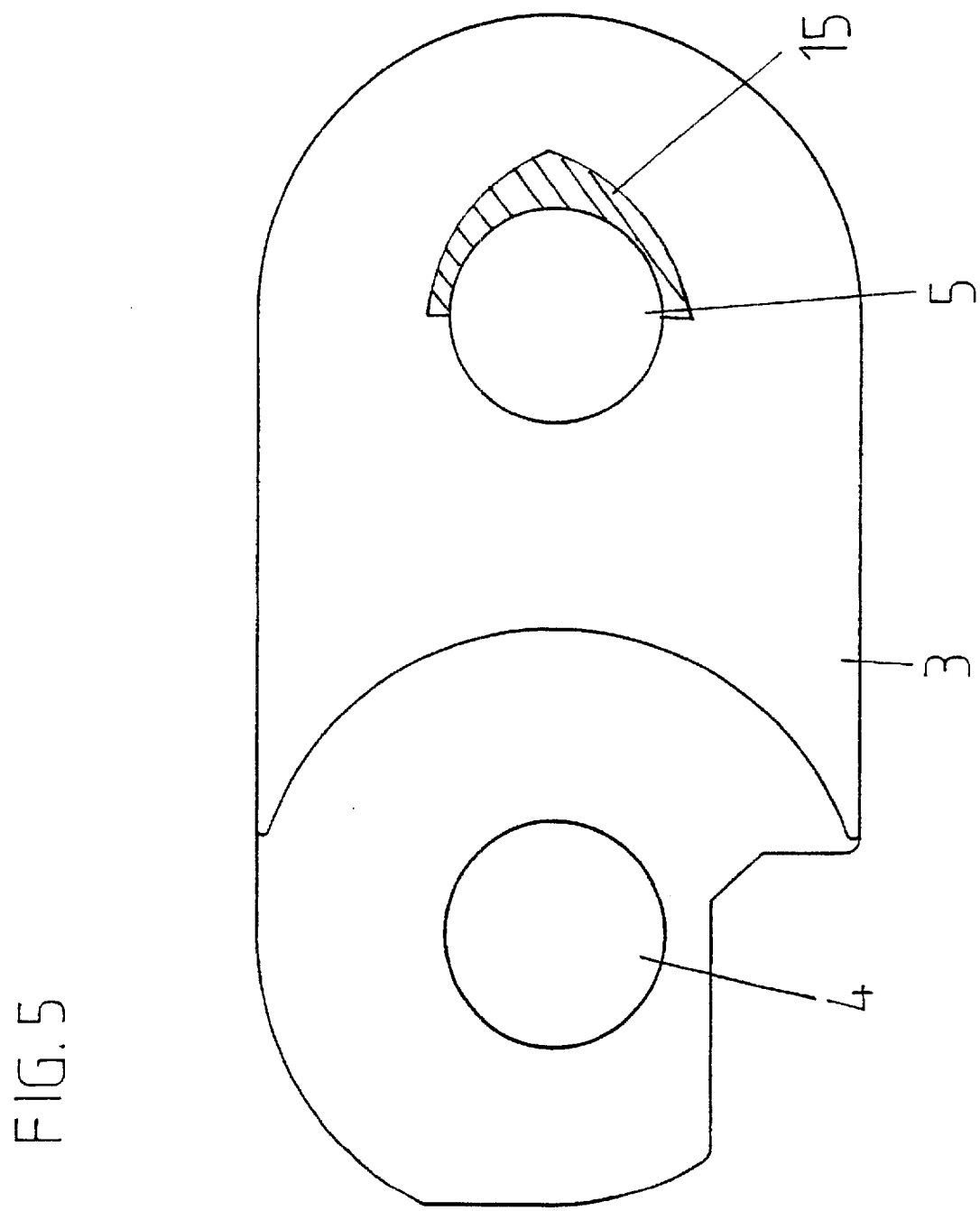
Figure 6:
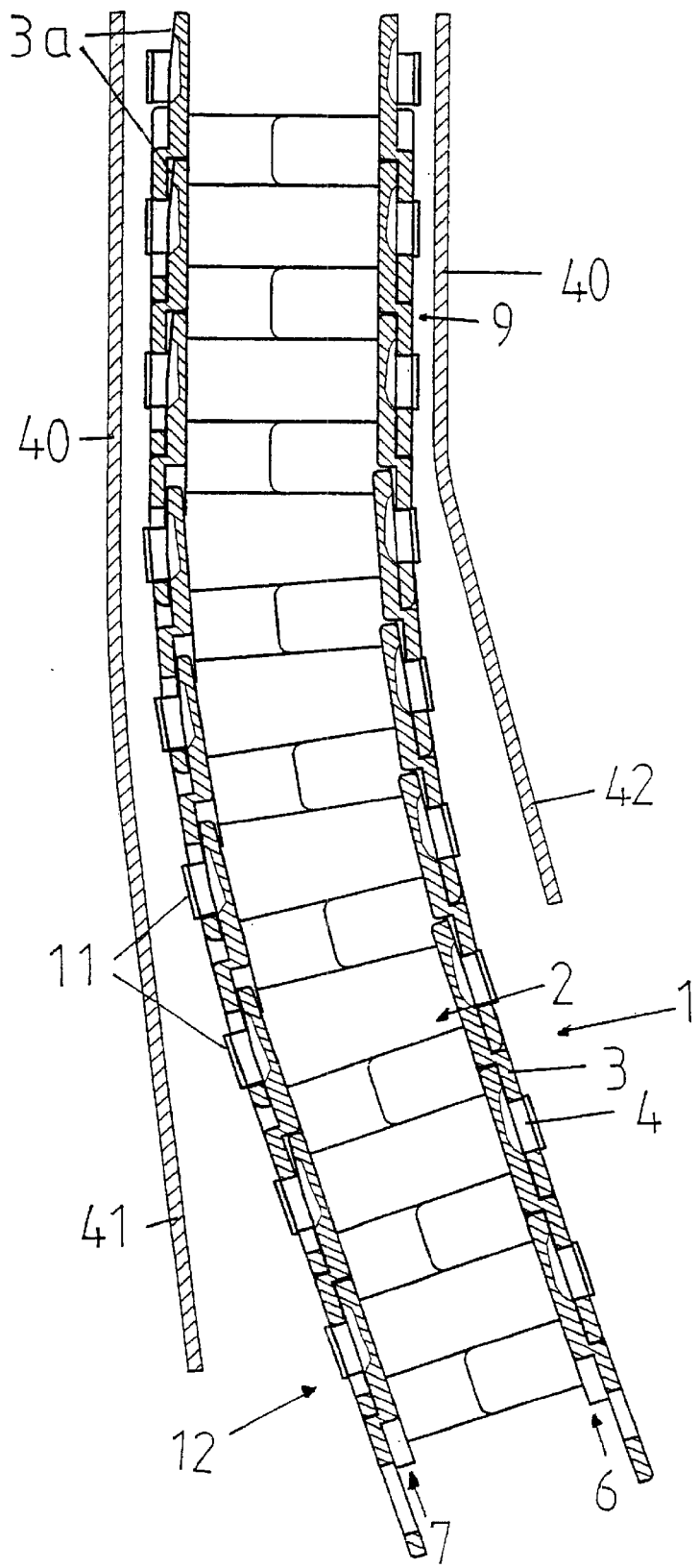

The invention is described by way of example hereinafter and illustrated by way of example with reference to the drawing in which:

FIG. 1a shows a plan view of a portion of an energy guide chain of a first embodiment according to the invention, FIG. 1b shows a modification of the energy guide chain shown in FIG. 1a, FIG. 2 shows a chain link of an energy guide chain as shown in FIG. 1 as a plan view (FIG. 2a), an end view (FIG. 2a) and a side view (FIG. 2c), FIG. 3 is a plan view of a chain link of a further embodiment with a deformable central region, and FIG. 4 shows a plan view of a chain link of a further embodiment with deformable pivot pins, FIG. 5 shows a side view of a link plate in a further embodiment with material weakening at the pivot pin receiving means, and FIG. 6 shows a plan view of an energy guide chain guided in a guide structure according to the invention, with a region which is deflected in the transverse direction.

FIG. 1 shows an energy guide chain 1 comprising chain links 2 which are pivotably connected together and which each have cranked link plates 3 connected by means of pivot pins 4 which engage into corresponding round openings 5 in the overlap region of the adjacent link plate in order to pivotably connect them together. The link plates 3 of the respective trains or lines 6, 7 of link plates which are to be connected together are connected together by a continuous crossbar (not shown) which is formed thereon in one piece and, to facilitate fitting the cable or the like which is to be guided therein, have a further apertured crossbar 8 which however can also be of a continuous configuration.

Between the pivot regions which are formed by the pivot pins and the openings 5 which in the illustrated embodiment are round, there are material weakenings extending over the entire height of the link plates 3, in the form of cross-sectional constrictions 20. The cross-sectional constrictions extend to about ¼ of the wall thickness of the overlap regions 21, 22 of the link plates and in the unloaded condition have a spread angle of 30–90° (here: about 45°). The constrictions on the one hand permit a constriction of the link plates themselves, in which case the pivot connections only have the play necessary for fixing the pivot pins and for pivotal movement of the chain links. In addition the spread angle of the notches or an adequate spacing between the flanks thereof permits the overlap regions 21, 22 of a chain link to adopt an angled position relative to each other, whereby the pivot connections are relieved of load.

The material weakenings which extend over the height of the link plates are provided immediately adjacent to the openings 5 for receiving the pivot pins 4 between the two pivot regions of the respective link plate, in accordance with the illustrated example approximately at the height of the end of the crossbar 8. As shown in FIG. 1 the film bridges are provided on both link plates of the chain links, which can also be the case when the elastically deformable regions are of different configurations, in particular if the elastically deformable regions are afforded by a smaller thickness of material or by virtue of a higher degree of elasticity of the respective material involved. It is however also possible to provide only one link plate with a film bridge.

The energy guide chain 1 can be arranged in such a way as to constitute a top run, a bottom run and a direction-changing region which connects the two runs, wherein the pivotal angle of the chain links relative to each other in the straight-ahead direction and in the angled position can be limited by abutments provided on the link plates 3.

FIG. 1b shows a modification of the energy guide chain as shown in FIG. 1a, wherein elastically deformable regions 20 permitting an increase in the length of the line of chain link plates are provided only on the link plates 3 of the line 6a thereof.

FIG. 2 shows a chain link of the chain illustrated in FIG. 1. The cross-sectional constrictions 20 forming the grooves on both link plates are open towards the outside of the chain and are identical on both link plates. The upper crossbar 8 is of an apertured configuration while the lower continuous crossbar is formed integrally on the link plates. To connect the link plates the chain has snap connections in the form of retaining beads or ridges 35 which are disposed at the free ends of the pins 4 and which are in the form of peripherally extending retaining projections.

By virtue of the design configuration according to the invention of the chain links (see also FIG. 2), the energy guide chain can be arranged, corresponding to the energy guide chain which is shown in FIG. 6 and which is not in accordance with the invention, with a first rectilinear region 9 which is adjoined by a region 10 that is angled in the transverse direction of the chain. The angled positioning of adjacent chain links is greater than is made possible by the play present in all directions in the pivot region of the chain links, being in the illustrated embodiment about 10–20°, without however being limited thereto. The region 10 which is formed by the chain links 11 and which is arcuate or angled with respect to the region 9 is in turn adjoined by a region 12 of the chain, which is straightened in the transverse direction. That angled positioning in the transverse direction is made possible by regions, which involved weakened material, in the link plates, which in accordance with the invention are in the form of elastically deformable regions, the regions permitting a variation in length of the line 7 of link plates beyond the length of the line 6 of link plates.

The ends of the inwardly disposed overlap regions of the chain links are chamfered or conically converge on the side towards the oppositely disposed chain link, in order to facilitate bending of the chain in the transverse direction. The bevelled regions 3a (see FIG. 1 and for further clarification FIG. 6) are here provided on the chain link plates which are outward in the bending radius. In a corresponding manner, openings which are open towards the interior of the chain can also be provided at the insides of the oppositely disposed overlap regions. That configuration of the ends of the overlap regions is not limited to the illustrated embodiment of the regions involving a weakening of material.

FIG. 3 shows a further embodiment in which the region 26 permitting a variation in length of the line of link plates is arranged in the connecting region of the outwardly cranked region 27 and the inwardly cranked region 28 of the link plate. The connecting region can also be positioned inclinedly relative to the adjoining regions 27, 28. The connecting region has an intermediate portion so that the adjoining regions of the outwardly and inwardly cranked parts of the link plates are not arranged in alignment, which is achieved here by the constrictions 29. That affords an increased degree of deformability of the connecting region 26 which permits a variation in length of the link plate under the effect of a force.

FIG. 4 shows a further embodiment in which the two pivot pins 30, 31 of the oppositely disposed link plates of-the chain link are of different elasticity and/or compressibility so that elastic deformability of one of the pivot pins 30, 31, with an elastically deformable region 30a, permits a variation in length of the line of chain link plates associated with that pivot pin. Optionally both pivot pins 30 and 31 can also be of such a configuration that, under forces acting transversely on the chain, it performs a transverse displacement, with a variation in the length of a line of link plates. In accordance with the illustrated embodiment, in addition to the deformable pivot pins the link plates 3 are also provided with constrictions 20, but the latter can also be omitted.

Furthermore, provided at a free end of one of the regions 8a, 8b, arranged at the same height, of the crossbar 8 is a projection 36 which engages into a corresponding opening 37 and in so doing engages behind an undercut configuration 38 of the crossbar region 8a. In that way, the crossbar regions 8a, b are pivotable relative to each other in the main plane thereof and are secured to prevent longitudinal displacement in the longitudinal direction of the crossbar so that the chain link cannot bend open. In order to permit pivotal movement of the substantially rigid crossbar regions 8a, b when lines are being fitted into or removed from the chain, in a direction towards the link plates 3, regions 39 of increased elasticity are provided on the crossbars, here at the ends towards the link plates 3.

FIG. 5 shows a further embodiment in which the region 15 which adjoins the opening 5 and which is towards the end of the link plate is elastically deformable by virtue of a smaller wall thickness or a higher level of elasticity, under the usual tensile loadings applied to the chain, and thereby permits an additional variation in the length of the line of link plates. The link plate can be in the form of a one-piece injection molding. The material-weakened region can also be arranged on the opposite side of the pivot opening and can thereby permit upsetting of the line of link plates.

FIG. 6 shows a guide structure 45 for energy guide chains according to the invention, with oppositely disposed side walls, wherein the structure can have a bottom support. Provided over a portion of the length thereof are straight guide profiles 40 which are arranged laterally of the energy guide chain and which are oriented in mutually parallel relationship, for receiving a region of the energy guide chain which is arranged in a straight configuration, with the guide profiles being arranged at the small spacing of the energy guide chain. In the longitudinal direction of the chain, the guide profiles 40 are adjoined by guide profiles 41, 42 which are formed in one piece thereon and which each include a different angle relative to the longitudinal direction of the straight guide profiles 40, so that the straight guide region of the guide structure is adjoined by a funnel-shaped guide region which limits lateral displacement of the chain.

List of References 1 energy guide chain
2 chain link
3 link plate
4 pin
5 opening
6, 7 line of link plates
6a, 6b line of link plates
8 crossbar
8a, b crossbar regions
9 straight region
10 angled region
11 chain link
12 straight region
13 link plate
14 opening
15 material-weakened region
20 constriction
21, 22 overlap region
26 connecting region
27 outwardly cranked region
28 inwardly cranked region
29 constriction
30, 31 pins
30a elastically deformable region
35 retaining bead
36 projection
37 opening
38 undercut configuration
39 elastic region
40, 41, 42 guide profiles
45 guide structure

What is claimed is:

1. An energy guide chain for guiding hoses, cables or lines comprising chain links (2) each consisting of two link plates (3) and at least one crossbar (8) connecting the link plates, wherein link plates (3) of adjacent chain links (2) have pivot regions comprising mutually corresponding pivot pins (4) and openings (5) for receiving the pivot pins, by means of which the chain links (2) are pivotably interconnected, and wherein the link plates (3) of adjacent chain links (2) have mutually overlapping overlap regions (21, 22), forming lines (6, 7) of link plates, wherein the mutually corresponding pivot pins (4) and openings (5) are arranged in the overlap regions (21, 22) of the link plates and wherein at least one link plate (3) is provided with a region (15, 20) of weakened material, which permits a variation in length of the link plate line (7) beyond the play which occurs in the pivot region (4, 5) in all directions of the link plate (3), wherein the material-weakened region (20) is in the form of an elastically deformable region of the link plate (3).

2. An energy guide chain as set forth in claim 1 wherein the elastically deformable region (15) is arranged at the level of the pivot connections (4, 5) of the adjacent chain links (12) and extends over the entire height of the link plate (3).

3. An energy guide chain as set forth in claim 1 wherein the elastically deformable region (20) is arranged between the pivot connections (4, 5) of the adjacent chain links and extends over the entire height of the link plate (3).

4. An energy guide chain as set forth in claim 1 wherein the elastically deformable region is in the form of a cross-sectional constriction of the link plate (3).

5. An energy guide chain as set forth in claim 4 wherein the cross-sectional constriction (20) has spaced-apart regions which have a lateral displacement relative to each other with respect to the main plane of the associated link plate (3) and which permit an increase in the length of the link plate, with a reduction in the lateral displacement.

6. An energy guide chain as set forth in claim 1 wherein the elastically deformable region (30*a*) is provided on a pivot pin (30) and is arranged between a point (35) of engagement of the adjacent link plate (3) on the pivot pin and the fixing region of the pivot pin to the link plate (3) associated with the same.

7. An energy guide chain as set forth in claim 1 wherein the elastically deformable region is arranged at a region (15) adjoining the opening (5) for receiving the pivot pin (4).

8. An energy guide chain as set forth in claim 1 wherein there are provided cranked chain links (2) each having a region (27) projecting to the exterior of the chain and a region (28) which is set back to the interior of the chain and a connecting region (26) disposed between them and that the connecting region (26) is in the form of an elastically deformable region over the entire height of the link plate (3).

9. An energy guide chain as set forth in claim 1 wherein provided at least in a region-wise manner on a line (6*a*, 7*a*) of link plates of the energy guide chain (1) are chain links (2) with link plates (3) having an elastically deformable region (20) permitting a variation in length of the line (6*a*, 7*a*), and that provided at the oppositely disposed link plates of the chain links there are no material-weakened regions permitting a variation in length of the line (6*a*).

10. An energy guide chain as set forth in claim 1 wherein there are provided chain links (2) in which both oppositely disposed link plates (3) are provided with an elastically deformable region.

11. An energy guide chain as set forth in claim 1 wherein there are provided chain links (2) having link plates (3) which in the overlap region (21, 22) on the side towards the adjacent chain link have bevels (3*a*) which facilitate deflection of the link plate (3) of the adjacent chain link in the transverse direction with respect to the energy guide chain (1).

12. An energy guide chain as set forth in claim 1 wherein the adjacent link plates (3) of a line (7) thereof are connected together by means of a snap connection (4, 5, 35).

13. An energy guide chain as set forth in claim 12 wherein the pivot pin (4) has retaining means (35) for making a snap connection.

14. An energy guide chain as set forth in claim 1 wherein at least one of the chain links (2) with an elastically deformable region (20) has a divided crossbar (8) with regions (8*a*, 8*b*) arranged at opposite link plates (3) and separated from each other by an interruption, and that at least one of the separated regions (8*a*) is provided with an opening (37) and the opposite region (8*b*) of the crossbar is provided with a projection (36) which engages into the opening.

15. A guide structure for receiving and guiding an energy guide chain as set forth in claim 1 wherein the guide structure (45) has straight guide profiles (40) which are oriented in mutually linear relationship and which are disposed in mutually opposite relationship and which have mutually oppositely disposed side walls for laterally guiding a region of the energy guide chain, which is arranged straight and which can be laid down between the side walls, wherein there is additionally provided at least one guide profile (41, 42) which includes an angle relative to the longitudinal direction of the guide profile (40) which is arranged straight.

16. A guide structure as set forth in claim 15 wherein provided at both opposite side walls of the guide structure (45) are guide profiles (41, 42) which adjoin the straight guide profiles (40) at an angle in the longitudinal direction and which on the opposite sides of the guide structure include a different angle relative to the straight guide profiles (40).

* * * * *